United States Patent [19]
Kelemen

[11] 3,906,511
[45] Sept. 16, 1975

[54] CASSETTE SCRATCH STRAIN RECORDER

[75] Inventor: Jozsef W. Kelemen, Ottawa, Canada

[73] Assignee: Leigh Instruments Limited, Carleton Place, Canada

[22] Filed: Nov. 19, 1973

[21] Appl. No.: 416,958

[52] U.S. Cl. .................. 346/7; 74/88; 192/41 S; 346/136
[51] Int. Cl.² .................. G01B 5/30; G01D 9/38
[58] Field of Search ............... 346/7, 77, 136, 145; 73/88; 33/147 D, 148 D; 74/88; 192/12 BA, 41 S

[56] References Cited
UNITED STATES PATENTS

| | | | |
|---|---|---|---|
| 3,389,611 | 6/1968 | Bey | 74/88 |
| 3,754,276 | 8/1973 | Endres | 346/7 |
| 3,825,934 | 7/1974 | Price et al. | 346/7 |

Primary Examiner—Joseph W. Hartary

[57] ABSTRACT

A recording instrument is disclosed for measuring and recording changes in linear distance between two predetermined points. The instrument is comprised of a recording tape and a scribing means for marking the changes in linear distance on the tape. The scribing means moves in a direction which is transverse to the longitudinal axis of the tape. The instrument includes a tape housing means which accommodates the tape so that the tape is free to move along its longitudinal axis but is substantially constrained from transverse movement. The instrument additionally includes a tape drive means for longitudinally advancing the tape under the influence of both positive and negative changes in the linear distance. The tape drive means includes a linear motion amplifier and a reciprocating to rotary motion converter.

10 Claims, 5 Drawing Figures

CASSETTE SCRATCH STRAIN RECORDER

INTRODUCTION, USE AND OPERATION AND DISCUSSION OF PRIOR ART

The present invention relates to a self-contained tape recorder for recording changes in linear distance between two points in space in general, and in particular, to a scratch strain tape recorder for recording strain.

Scratch strain recording is based on the recording of relative displacements or movements between two points of known initial separation on the surface of a specimen under investigation. In the strain recorder mechanism, these movements are translated to corresponding movements between a recording medium and a recording means, thereby resulting in permanent markings on the surface of the recording medium.

According to the present invention, a tape as a recording medium is driven through the recorder as a function of the strain being recorded irrespective of the sense of strain. As a result, the recording medium is consumed when and only when the recorder detects a strain level above a minimum threshold value which is characteristic of the recorder mechanism. The recording medium or tape is advanced in a path along its length past a recording station in one predetermined direction by strain detected by the recorder. Since the tape is moved in a path which is in a plane perpendicular to actual strain direction, the resulting recordings of strain describe a substantially triangular graph on the tape. The change in strain is proportional to the transverse graph on the tape. The change in strain is proportional to the transverse distance separating any two points which lie on this triangular graph.

A scratch strain recorder of a similar type is described in U.S. Pat. No. 3,430,250, which issued on Feb. 25, 1969. However, the device disclosed in that patent has several drawbacks which are overcome by the present invention. The recording target on the device according to the above mentioned patent is circular and information recorded thereon is recorded in a circular path. As a result, the device has a limited recording capacity, i.e., one rotation of the circular target. In contrast, the present invention records strain on a tape which can be provided at any length.

The device according to the above mentioned patent rotates the circular target via the ratcheting action of a pair of resilient multi-stranded metal fingers engaging a cylindrical surface near the outer circumference of the disc shaped target. A finite minimum strain is required to move one of the fingers far enough to successfully rotate the circular target. If the recorder is subjected to a series of repeated strains below the minimum, the target does not move but the fingers tend to dig into the cylindrical surface so that in order to get the target rotating again, a strain is necessary which is considerably larger than the above mentioned minimum strain. As a result, the device according to the above mentioned patent exhibits a non-constant "dead space" or threshold. The device according to the present invention also exhibits a small threshold, i.e., a minimum level of strain below which transportation of the tape is not made, but the threshold is due to the mechanical hysteresis of the various parts and is always the same in its magnitude. In other words, the movement of the tape past a recording station is generated by the elastic deformation of the driving components whereas, in the device according to the above mentioned prior art patent, rotation of the target involves the plastic deformation of the cylindrical surface near the outer circumference of the target. As a result, the device according to the present invention exhibits a substantially constant magnitude "dead space."

In addition, the device according to the above mentioned patent rotates the target when subjected to strain in one sense only. The resulting recording therefore, takes on the shape of a saw tooth graph. The present invention transports the tape past the recording station when the recorder is subjected to strain in both senses. As a result, a substantially triangular graph is produced. The triangular graph spaces out to a greater degree relative points on the recorded graph in the neighbourhood of a recorded strain reversal, thereby making it easier to interpret the recorded graph.

GENERAL DESCRIPTION

The device according to the present invention is comprised of a strain plate which is connected at one end to a work piece in which the strain is to be measured either directly or indirectly by the use of, for example, an adapter block. The strain plate is connected at its other end to one end of a strain recording plate which may be an integral part of the strain plate. The strain recording plate carries a stylus which either scribes or indents the tape. The other end of the strain recording plate is connected to one end of a bifurcated beam. The other end of the bifurcated beam is connected to a housing which encloses the bifurcated beam, a spring clutch and drive shaft which transports the tape via a capstan. The bottom of the housing is securely fastened to a bottom plate which is, in turn, secured to the work piece. The strain recording plate is thereby sandwiched between the housing and the bottom plate. However, sufficient opening is provided between the housing and the bottom plate to provide free movement of the strain recording plate.

The invention contemplates the use of a cassette for holding the tape. The cassette is clipped onto one end of the housing, however, if the cassette is not used, the housing can be extended to accommodate the tape. Since the housing is fixed to the work piece via the bottom plate, the stylus which is connected to the strain recording plate moves under the influence of strain with respect to the tape in a direction which is transverse to the length of the tape. Since the distance between the two points at which the strain recorder is connected to the work piece, can be determined exactly and since the material of the work piece is known, the strain in the work piece can be directly related to the movement of the stylus relative to the tape. Temperature compensation can be achieved by making the strain plate from the same material as the work piece in which the strain is being measured. A second scribe, known as a reference scribe is rigidly affixed to the housing and also marks the tape. Any lateral movement of the tape within its housing and also marks the tape. Any lateral movement of the tape within its housing can be manually compensated by observing the reference marked on the tape by the reference scribe.

As already mentioned above, the tape is advanced via a rotating motion generated from the strain recorded. The bifurcated beam has one of its free ends connected to the strain recording plate and its other free end connected to the housing. The U-shaped end portion of the bifurcated beam has two extension beams affixed thereto. Both extension beams move upwards or downwards in parallel arcs defined by the geometry of the bifurcated beam under strain. A torsion spring of one or more turns is set on a disc. One end of the spring is coupled to one of the extension beams. The disc is provided with a groove of sufficient width for retaining the spring. The other extension beam has a second torsion spring associated with it and this spring also fits around the disc. The disc has a second groove running around its circumference to retain the second spring. When the end of the bifurcated beam attached to the strain recording plate moves in a given direction due to strain of one sense being exerted on the recorder, one spring loosens on the disc and the other spring tightens on the disc, thereby turning the disc. When strain in the opposite sense acts on the recorder, the bifurcated beam bends in the opposite direction and the two extension beams follow. Here again, one of the springs tightens on the disc and the other spring loosens on the disc. The two springs are placed on the disc with such an orientation that the disc rotates in the same direction as when strain affected the beam so as to move it in the first mentioned direction. The disc is directly connected to a drive shaft and the shaft rotates in one direction only, say counter clockwise, under the influence of strain in both senses. The bifurcated beam encloses the shaft on two sides and an aperture is provided in the end portion of the bifurcated beam to allow the shaft to protrude therethrough. The two extension beams, as mentioned before, are affixed to the end portion of the bifurcated beam and are arranged on opposite sides of the aperture. The shaft protrudes through the housing at one of its ends. The cassette, which as mentioned above, can be provided to accommodate the tape, mates with the housing at this end.

The cassette contains a cavity for accommodating a pinch roller, a capstan, a supply pin and a take-up pin. Several turns of recording tape are loosely wound around the supply pin. The tape then proceeds between the pinch roller and the capstan to the take-up pin. Several turns of the tape are tightly wound around the take-up pin. The capstan is held in the cassette by a capstan shaft. When the cassette is positioned on the strain recorder, the capstan shaft disengagably connects with the drive shaft. An opening is cut in the cassette so that the stylus has access to the tape at the recording station.

A second embodiment of the recording instrument according to the present invention replaces the single bifurcated beam with two bifurcated beams or a double bifurcated beam. One bifurcated beam is arranged on one side of the shaft. Its free ends are connected in the same way as was described for the single bifurcated embodiment. One extension beam is affixed to the U-shaped end portion of this bifurcated beam and is associated with one of the torsion springs. The other bifurcated beam is arranged on the opposite side of the shaft in exactly the same manner. A second extension beam is connected to the U-shaped end portion of this second bifurcated beam and is associated with the other spring.

The two bifurcated beams can be formed in one piece and is known as a double bifurcated beam. A double bifurcated beam is formed from two bifurcated beams by merely connecting one corresponding free end of each bifurcated beam together by, for example a transverse interconnecting beam.

In accordance with the present invention there is provided a recording instrument for measuring and recording changes in linear distance between two predetermined points comprising: a recording tape, a scribing means for marking the changes in linear distance on said tape, said scribing means moving in a direction which is transverse to the longitudinal axis of said tape; a tape housing means accommodating said tape so that said tape is free to move along its longitudinal axis but is substantially constrained from transverse movement; and a tape drive means for longitudinally advancing said tape under the influence of both positive and negative changes in said linear distance, said tape drive means including a linear motion amplifier and a reciprocating to rotary motion converter.

DESCRIPTION OF THE DRAWINGS

The present invention will be described in detail hereinbelow with the aid of the accompanying drawings in which.

DETAILED DESCRIPTION

Figure 1:
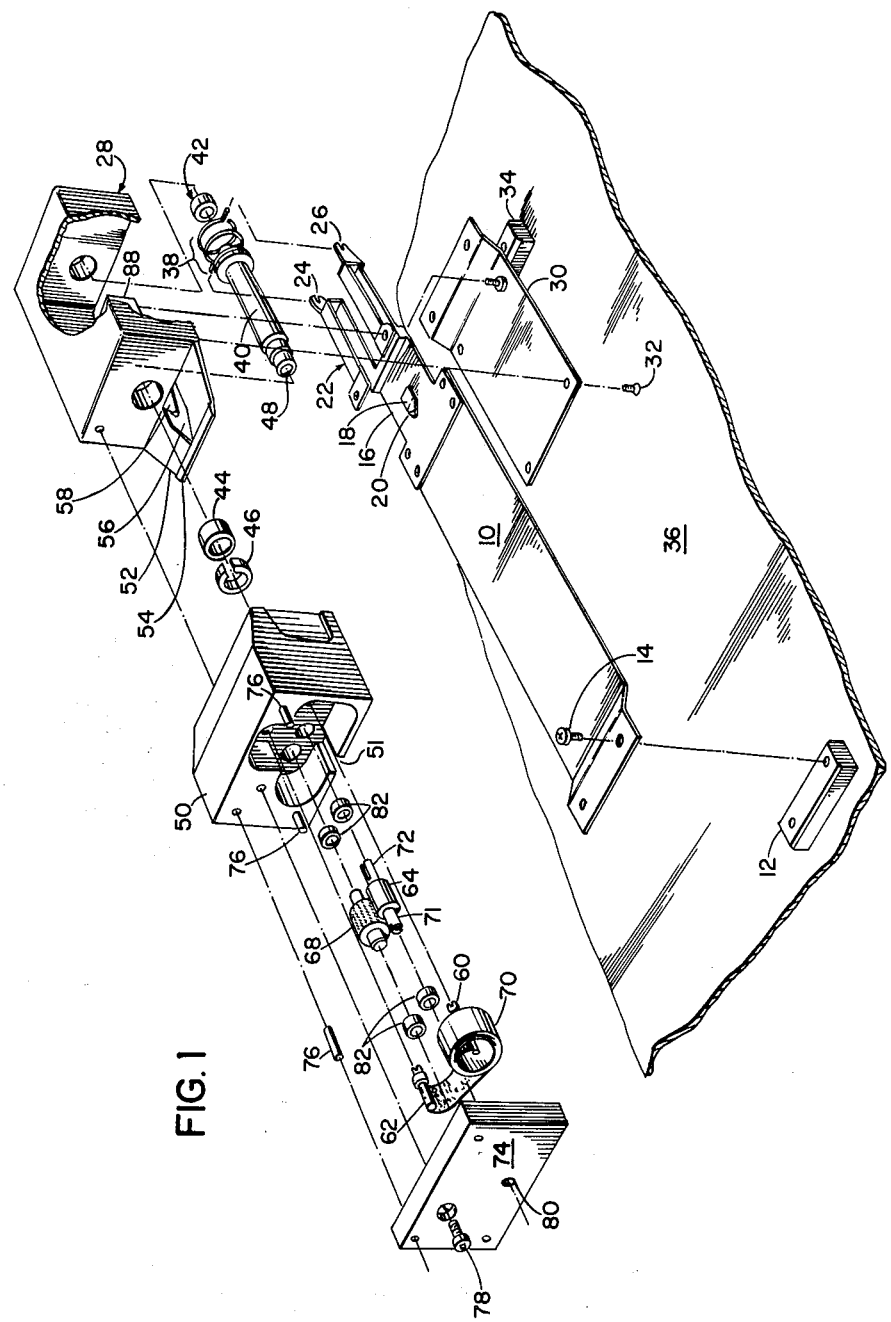
FIG. 1 is an exploded perspective view of a particular embodiment according to the present invention incorporating a double figurcated beam.

Referring to FIG. 1, a strain plate 10 is connected at one of its ends to an adapter block 12 in any convenient way. In the figure, the strain plate is connected to the adapter block by screws, one of which is indicated at 14. It should be noted that the end of the strain plate 10 can be directly connected to the work piece. The use of the adapter block has merely been found to be a convenient interface. The other end of the strain plate 10 is connected to a strain recording plate 16. The strain plate is riveted to the strain recording plate in the embodiment shown, however, the two pieces can be connected in any convenient way or the strain plate and the strain recording plate can be made in one piece. A stylus arm 18 is mounted on the strain recording plate 16. A stylus 20 is mounted on the stylus arm. The strain recording plate 16 is connected to a double bifurcated beam 22. It is not necessary that the double bifurcated beam be made of one piece, and, the scope of the present invention contemplates the use of two separate bifurcated beams which can be arranged to substantially duplicate the configuration of a double bifurcated beam. The U-shaped ends of the double bifurcated beam each have attached thereto, extension beams 24 and 26.

The strain recorder according to FIG. 1 further comprises a housing 28. The housing 28 contains the double bifurcated beam, a drive shaft and a spring clutch. The housing 28 is mounted on one end of a second strain plate 30 by, for example, screws, one of which is indicated at 32. An access is provided in the housing at its mounting surface so that the strain recording plate can enter the housing. The other end of the second strain plate is connected to a second adapter block 34. Adapter blocks 12 and 34 are affixed to a work piece generally indicated by reference numeral 36, in which strain is to be measured. The adapter block can be mounted on the work piece in any convenient way, as for example, by bonding.

Rotary motion for advancing the tape is generated by a linear motion amplifier, a reciprocating to rotary motion converter and a drive shaft 40. The linear motion amplifier is comprised of the double bifurcated beam 22 and the extension beams 24 and 26. The reciprocating to rotary motion converter is comprised of the double spring clutch generally indicated at 38. The drive shaft 40 is mounted in the housing 28 via bearings 42 and 44. Split washer 46 holds the bearing 44 in place. A circular blind hole 48 is provided at one end of the shaft 40.

The cassette assembly 50 is connected to the housing 28 via a cantilevered locking plate 52 and locking tab 54. An opening 56 is provided in the cantilevered locking plate 52 so that when the cassette is connected to the housing the stylus 20 has access to the recording tape. A reference arm and stylus 58 are also mounted in the opening 56. The reference arm and stylus are rigidly connected to the housing 28. When the cassette is in place on the housing, the reference stylus contacts the recording tape.

Figure 3:
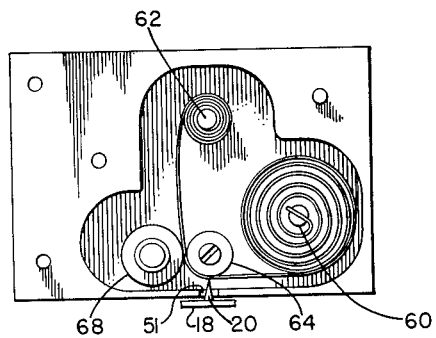
FIG. 3 is an end view of the cassette used in the embodiment shown in FIG. 1.

The cassette assembly 50 has a cavity formed therein to accommodate a supply pin 60, a take-up pin 62, a capstan 64 and a pinch roller 68, (see FIGS. 1 and 3). The recording tape 70 is loosely wound on the supply pin 60, is fed between the capstan 64 and the pinch roller 68 and is tightly wound on the take-up pin 62. The action of the capstan and the pinch roller operating on the tape, ensures a smooth movement of the tape from the supply pin to the take-up pin. The cavity arranged in the cassette assembly 50 is of sufficient size to allow expansion of the tape around the take-up pin.

The bottom of the cassette has an opening 51 positioned therein. The opening in the cassette permits access of the recording stylus 20 and the reference stylus 58 with the tape 70 when the cassette is connected to the housing.

The capstan is mounted on a capstan shaft 71, which is provided with a long slot at one end 72. When the cassette assembly 50 is connected to the housing, shaft end 72 fits into the circular opening 48 of drive shaft 40. The fit between the capstan shaft and the drive shaft is a friction fit which allows the transmission of torque from the drive shaft 40 to the capstan 64. In its assembled form, the cassette assembly is closed by a cover 74. The cover is located on the cassette assembly 50 by locating pins 76 and a screw 78. The capstan shaft 71, has at its other end, a short screwdriver type slot. A hole 80 is provided in the cover 74, which communicates with the capstan shaft. A screwdriver can be placed in the hole to turn the capstan to manually advance the tape through the cassette. The pinch roller and the capstan 64 are held in the cavity of the cassette assembly 50 for easy rotation therein by bearings 82.

Figure 2:
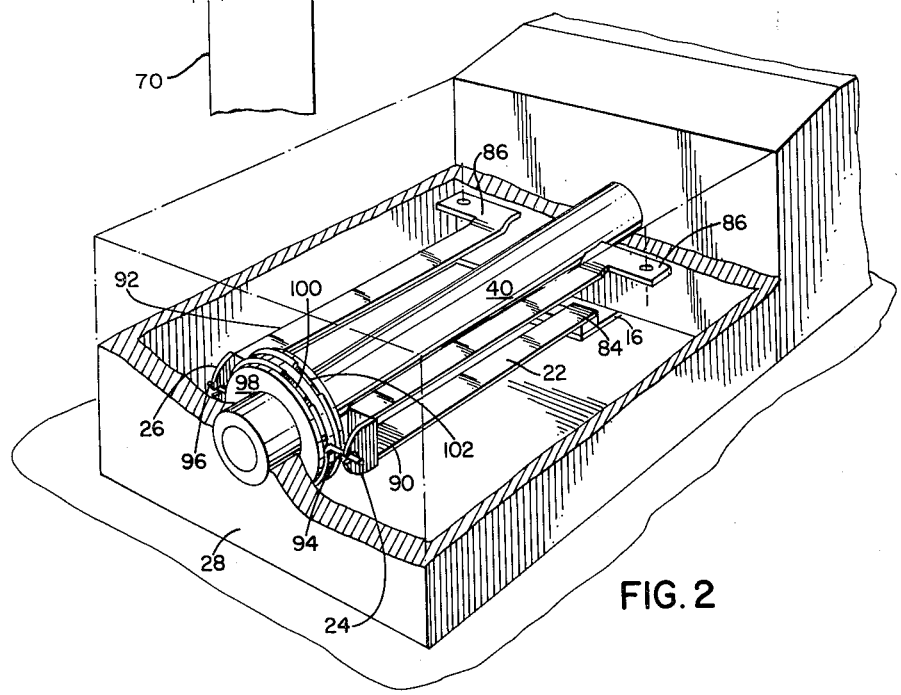
FIG. 2 is a perspective view of a portion of the embodiment shown in FIG. 1, partially broken away.

The rotary drive for advancing the tape through the cassette will be explained with reference to FIG. 2. One end 84 of the double bifurcated beam 22 is connected to the strain recording plate 16. The other ends 86 of the double bifurcated beam 22 are connected to the housing 28 by way of a step 88 formed in the housing (see FIG. 1). Since the housing 28 is fixed to the work piece via one adapter block and a strain recording plate 16 is fixed to the other adapter block via the strain plate 10, relative movement of the adapter blocks will cause the U-shaped ends 90 and 92 of the double bifurcated beam to move upwardly and downwardly. A strain in one sense, which urges the adapter blocks together, will move the ends 90 and 92 of the double bifurcated beam upwards. A strain in the opposite sense, i.e., a strain which tends to urge the adapter blocks apart, will move the ends 90 and 92 of the double bifurcated beam in a downward direction. Extension beams 24 and 26 are connected to the ends 90 and 92 of the double bifurcated beam, respectively. Extension beams 24 and 26 each have a notch located therein to accept one end of single turn spring 94 and one end of single turn spring 96 respectively. A disc 98 is fixed to the drive shaft 40. The disc has two grooves 100 and 102, located along its outer cylindrical surface to retain the springs 94 and 96. When the double bifurcated beam moves downwardly, spring 96 tightens around the disc 98 and rotates the disc and the drive shaft in a counter clockwise direction as observed from FIG. 2. When the double bifurcated beam moves downwardly, the spring 94 loosens on the disc 98 and slippage takes place between the spring and the disc. When the double bifurcated beam moves upwardly, spring 94 tightens around the disc 98 and rotates the disc and the shaft 40 in a counter clockwise direction. When the double bifurcated beam moves upwardly, the spring 96 loosens on the disc 98 and slippage takes place between the spring 96 and the disc 98. As a result of this action, strain acting on the strain recorder in either sense causes a rotation of the drive shaft in a counter clockwise direction. When the cassette 50 is attached to the housing 28, the capstan shaft 71 connects with the drive shaft 40. As a result, the capstan 64 turns in a clockwise direction as observed from FIG. 3 and advances the tape from the supply pin to the take-up pin whenever a detectable strain in either sense acts on the strain recorder.

The double bifurcated beam 22 and the extension beams 24 and 26 are dimensioned so that a linear amplification results. If the linear movement of the ends 84 of the double bifurcated beam is defined by X, the upward or downward movement of the extension beams 24 and 26, at the point where they connect to the single turn springs 94 and 96 will be AX, where A is greater than unity.

Figure 4:
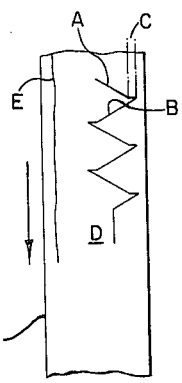
FIG. 4 is a portion of the tape used in the embodiment shown in FIG. 1.

The markings on the tape can be seen in FIG. 4, which shows a portion of the recording tape 70. The recording tape is moved along its longitudinal axis in the direction shown by the arrow. Actual strain recordings are indicated generally by the line D. Looking in more detail at line D, the sloped line A indicates a change in strain in one sense. The transverse distance between any two points on line A is proportional to the magnitude of the strain change recorded in that sense. Sloping line B indicates a change in strain in the opposite sense. Again, the transverse distance between any two points on the line B is proportional to the change in strain in the opposite sense affecting the work piece. The dimension C appearing in FIG. 4 indicates the "dead space" or threshold. The dead space exists because a small finite and predictable amount of strain change must act on the strain recorder, moving the bifurcated beam either upwardly or downwardly before the action of the springs and the disc begin to rotate the shaft 40. Note however, that there is no plastic deformation of either the bifurcated beam, the extension beams, the springs or the disc surface. As a result, the "dead space" will remain substantially constant with usage throughout the lifetime of the device.

A line E is marked on the tape by the reference stylus 58. The line E can be used to manually correct the marking D on the tape in the event that there is a small transverse movement of the tape 70 with respect to the recorder housing 28. As mentioned above, a change in strain is proportional to the transverse distance between any two points on the graph, which, of course, represents the magnitude of the relative movement of the two adapter blocks. If there is a transverse displacement of the line E at any such point or points, then that transverse displacement indicates a transverse movement of the tape relative to the recorder housing and the magnitude of this movement must be taken into consideration when calculating the actual magnitude of the transverse distances between any two points on the graph.

Figure 5:
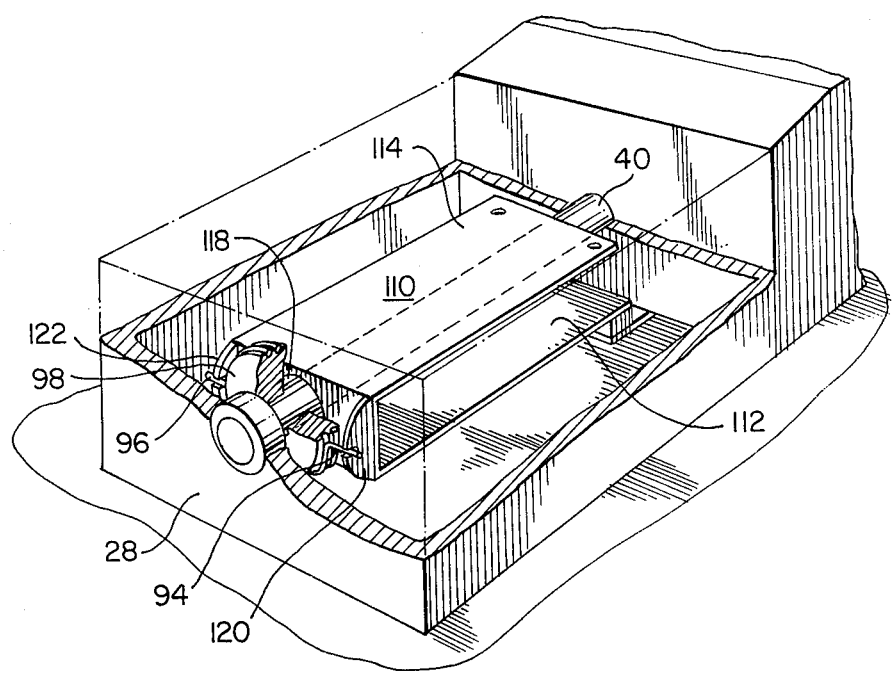
FIG. 5 is a perspective view of a portion of a second embodiment incorporating a single bifurcated beam.

FIG. 5 shows another embodiment of the scratch strain recorder. The double bifurcated beam of the first mentioned embodiment is replaced by a single bifurcated beam 110. One free end 112 of the bifurcated beam is connected to the end of the strain recording plate 16. The other free end 114 of the bifurcated beam is connected to the housing 28 at step 88. The U-shaped end 116 of the bifurcated beam 110 has an aperture 118 located therein to allow passage of the shaft 40. The aperture 118 must be of sufficient size so as to allow the U-shaped end of the bifurcated beam to move upwardly and downwardly in operation without contacting the shaft. Extension beams 120 and 122 are affixed to either side of the U-shaped end 116 of the bifurcated beam and run substantially parallel to the shaft 40. Extension beam 120 is connected to single turn spring 94. Extension beam 122 is connected to single turn spring 96. In operation, this embodiment is identical to the embodiment described with reference to the double bifurcated beam.

In both of the embodiments described above it is important to note that no mechanical play or lash is introduced into the tape advancing system until after the amplification of the linear movement is accomplished. As a result no mechanical play or lash is amplified by the system. The connection between the spring forks and the ends of the one turn springs and the action of the one turn springs on the disc introduce a slight amount of mechanical play or lash. However, the amount of play, introduced at this point in the system, is not amplified and indeed it is reduced by the ratio of the diameters of the disc and the capstan.

What I claim as my invention is:

1. A recording instrument for measuring and recording changes in linear distance between two predetermined points comprising:
   a. a recording tape;
   b. a scribing means for making the changes in linear distance on said tape, said scribing means moving in a direction which is transverse to the longitudinal axis of said tape;
   c. a tape housing means accommodating said tape so that said tape is free to move along its longitudinal axis but is substantially constrained from transverse movement;
   d. a tape drive means for longitudinally advancing said tape under the influence of both positive and negative changes in said linear distance, said tape drive means including a linear motion amplifier and a reciprocating to rotary motion converter, said reciprocating to rotary motion converter being comprised of a double spring clutch, said clutch comprising a disc having an outer cylindrical surface and a first and a second single turn spring, said first and second spring each having an internal diameter, the outside diameter of said disc being greater than said internal diameter of said first and second spring, said first and second spring each being mounted on said cylindrical surface of said disc, each spring having one of its ends connected to said linear motion amplifier whereby when said ends are moved in one substantially linear direction by said linear motion amplifier said first spring tightens on said disc whereby turning said disc in one direction of rotation, said second spring loosening on said disc, thereby allowing said rotation, and whereby, when said ends are moved in the opposite substantially linear direction by said linear motion amplifier, said second spring tightens on said disc thereby turning said disc in said one direction of rotation, said first spring loosening on said disc thereby allowing said rotation; and
   e. a recordoer housing enclosing said tape drive means, said recorder housing being fixed to one of said two predetermined points and said scribing means being in a fixed relationship with respect to the other of said two predetermined points.

2. A recording instrument according to claim 1, wherein said tape housing means is a cassette.

3. A recording instrument according to claim 2, wherein said cassette includes a rotatably mounted capstan; a pinch roller; a fixed supply pin and a fixed take-up pin, one end of said recording tape being attached to and loosely wound around said supply pin, the other end of said recording tape being attached to and tightly wound around said take-up pin, said tape being advanced from said supply pin to said take-up pin by said capstan which forms part of said tape drive means, said pinch roller operatively holding said tape against said capstan.

4. A recording instrument according to claim 3, wherein said recorder housing has locking means affixed to one end thereof for connecting said cassette to said recorder housing, said reciprocating to rotary motion converter being supplied with a shaft which connects said capstan upon the connection of said cassette to said recorder housing.

5. A recording instrument according to claim 4, wherein said locking means is comprised of a cantilevered locking plate and a locking tab; wherein one end of said cantilevered locking plate connects with said one end of said recorder housing and the opposite end of said cantilevered locking plate connects with said locking tab, and wherein said cassette rests on said cantilevered locking plate and is urged against said one end of said recorder housing by said locking tab.

6. A recording instrument according to claim 2, further including a reference stylus means affixed to said recorder housing and operatively associated with said tape to mark on said tape a recording of slight transverse movements of said tape relative to said recorder housing, said recording being provided so that compensation can be made in the measuring of said changes in linear distance in the event of slight transverse movements of the tape with respect to said recorder housing.

7. A recording instrument according to claim 1, further including a reference stylus means affixed to said recorder housing and operatively associated with said tape to mark on said tape a recording of slight transverse movements of said tape relative to said recorder housing, said recording being provided so that compensation can be made in the measuring of said changes in linear distance in the event of slight transverse movements of the tape with respect to said recorder housing.

8. A recording instrument according to claim 1, wherein said outer cylindrical surface of said disc is provided with grooves to retain said first and second spring.

9. A recording instrument according to claim 1, wherein said linear motion amplifier includes the combination of a bifurcated beam and two extension beams, one free end of said bifurcated beam being in a fixed relationship with one of said two predetermined points, the other free end of said bifurcated beam being in a fixed relationship with respect to the other of said two predetermined points, each of said extension beams being connected at one end to the bifurcation of said bifurcated beam, said extension beams being arranged on opposite sides of said disc so that the other ends of the extension beams connect with the ends of said first and second spring in a one to one correspondence, the dimensions of said bifurcated beam and said extension beams being such that when the magnitude of the relataive movement between said two predetermined points is defined by X, the movement of said other ends of said extension beam is AX where A is greater than unity.

10. A recording instrument according to claim 1, wherein said linear motion amplifier includes the combination of a first and a second bifurcated beam and a first and a second extension beam, one free end of each bifurcated beam being in a fixed relationship with respect to one of said two predetermined points, the other corresponding free end of each bifurcated beam being in a fixed relationship with respect to the other of said two predetermined points, said extension beam being arranged on one side of said disc and connecting the bifurcation of said first bifurcated beam with the end of said first spring, said second extension beam being arranged on the opposite side of said disc and connecting the bifurcation of said second bifurcated beam with the end of said second spring, the dimensions of said first and second bifurcated beams and said first and second extension beams being such that when the magnitude of the relative movement between said two predetermined points is defined by X the movement of the ends of said first and second bifurcated beam connecting said first and second springs is AX where A is greater than unity.

* * * * *